US007147152B2

(12) United States Patent
Yoshioka et al.

(10) Patent No.: US 7,147,152 B2
(45) Date of Patent: Dec. 12, 2006

(54) RECORDING MEDIUM DISPENSING MACHINE

(75) Inventors: Kazuei Yoshioka, Tokyo (JP); Jun Fujimoto, Tokyo (JP)

(73) Assignee: Aruze Corp., Tokyo (JP)

( * ) Notice: Subject to any disclaimer, the term of this patent is extended or adjusted under 35 U.S.C. 154(b) by 222 days.

(21) Appl. No.: 10/856,562

(22) Filed: May 28, 2004

(65) Prior Publication Data

US 2004/0238642 A1 Dec. 2, 2004

(30) Foreign Application Priority Data

May 29, 2003 (JP) ............................ 2003-153410

(51) Int. Cl.
*G06F 7/08* (2006.01)

(52) U.S. Cl. ........................................................ 235/381

(58) Field of Classification Search ................. 235/381
See application file for complete search history.

(56) References Cited

U.S. PATENT DOCUMENTS

| | | | | |
|---|---|---|---|---|
| 3,051,477 | A | 8/1962 | Pavlic | |
| 5,019,841 | A * | 5/1991 | Fulton et al. | 271/265.01 |
| 5,382,024 | A * | 1/1995 | Blaha | 273/149 R |
| 6,308,886 | B1 * | 10/2001 | Benson et al. | 235/375 |
| 6,321,980 | B1 * | 11/2001 | Yazumi et al. | 235/379 |
| 6,866,201 | B1 * | 3/2005 | Abe et al. | 235/493 |
| 2003/0010827 | A1 | 1/2003 | Hilton et al. | |

FOREIGN PATENT DOCUMENTS

| | | |
|---|---|---|
| DE | 200 19 653 | 3/2001 |
| JP | 2002-143539 | 5/2002 |

* cited by examiner

*Primary Examiner*—Daniel Stcyr
(74) *Attorney, Agent, or Firm*—Jordan and Hamburg LLP

(57) ABSTRACT

A recording medium dispensing machine according to an aspect of the present invention is provided with a main body having a carry in/out opening through which a recording medium to record predetermined information thereon is carried in/out. Inside the main body is provided a storage device to store a plurality of recording media in a stacked manner. The recording medium dispensing machine is further provided with a carrying device that carries the recording medium back and forth between the storage device and the carry in/out opening, and a storage/feeding device which causes a recording medium stored in the storage device to separate or protrude from/into a carry path formed by the carrying device, and whereby causes the recording medium carried by the carrying device to be stored in the storage device, while causing the recording medium stored in the storage device to be fed from the storage device by the carrying device.

27 Claims, 5 Drawing Sheets

RECORDING MEDIUM DISPENSING MACHINE

The present disclosure relates to subject matter contained in Japan Patent Application No. 2003-153410 filed on May 29, 2003, which are expressly incorporated herein by reference in its entireties.

BACKGROUND OF THE INVENTION

1. Field of the Invention

The present invention relates to a new recording medium dispensing machine capable of storing a plurality of recording media to record predetermined information thereon, while discharging a stored recording medium.

2. Description of Related Art

Storage apparatuses that store recording media such as IC cards are used in various fields. For example, a game medium supplying apparatus (for example, a ball lending apparatus of a pachinko machine) installed between game machines (for example, pachinko machines) is provided with a card storage apparatus that collects used prepaid cards to store (for example, see JP-A 2002-143539). Used prepaid cards are generally discarded, but recently, have been reused in accordance with the trend of efficient use of resources.

However, since the conventional card storage apparatus is complicated, for example, in a mechanism for feeding a carried card into a card storage portion, it is not possible to adequately miniaturize the apparatus. It is thus difficult to incorporate the apparatus into various kinds of machines in a compact size.

Further, the conventional card storage apparatus simply stores cards for the reuse of the cards, and a dedicated operator collects the stored cards. In other words, since the conventional card storage apparatus only stores cards and does not have the function of discharging the stored cards for the reuse, a supply apparatus is needed separately in the case of resupplying the card stored in the card storage apparatus to the market.

Accordingly, there is required a recording medium dispensing machine which is a simple and compact in configuration, has both functions of storing and discharging a recording medium, and enables the reuse of the recording medium to be performed simply.

BRIEF SUMMARY OF THE INVENTION

In an aspect of the present invention, there is provided a recording medium dispensing machine having a main body with a carry in/out opening through which a recording medium to record predetermined information thereon is carried in/out, a storage device that is provided inside the main body to store a plurality of recording media in a stacked manner, a carrying device that carries the recording medium back and forth between the storage device and the carry in/out opening, and a storage/feeding device which causes a recording medium stored in the storage device to separate or protrude from/into a carry path formed by the carrying device, and whereby causes the recording medium carried by the carrying device to be stored in the storage device, while causing the recording medium stored in the storage device to be fed from the storage device by the carrying device.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

An embodiment of the present invention will be described below with reference to accompanying drawings.

Figure 1:
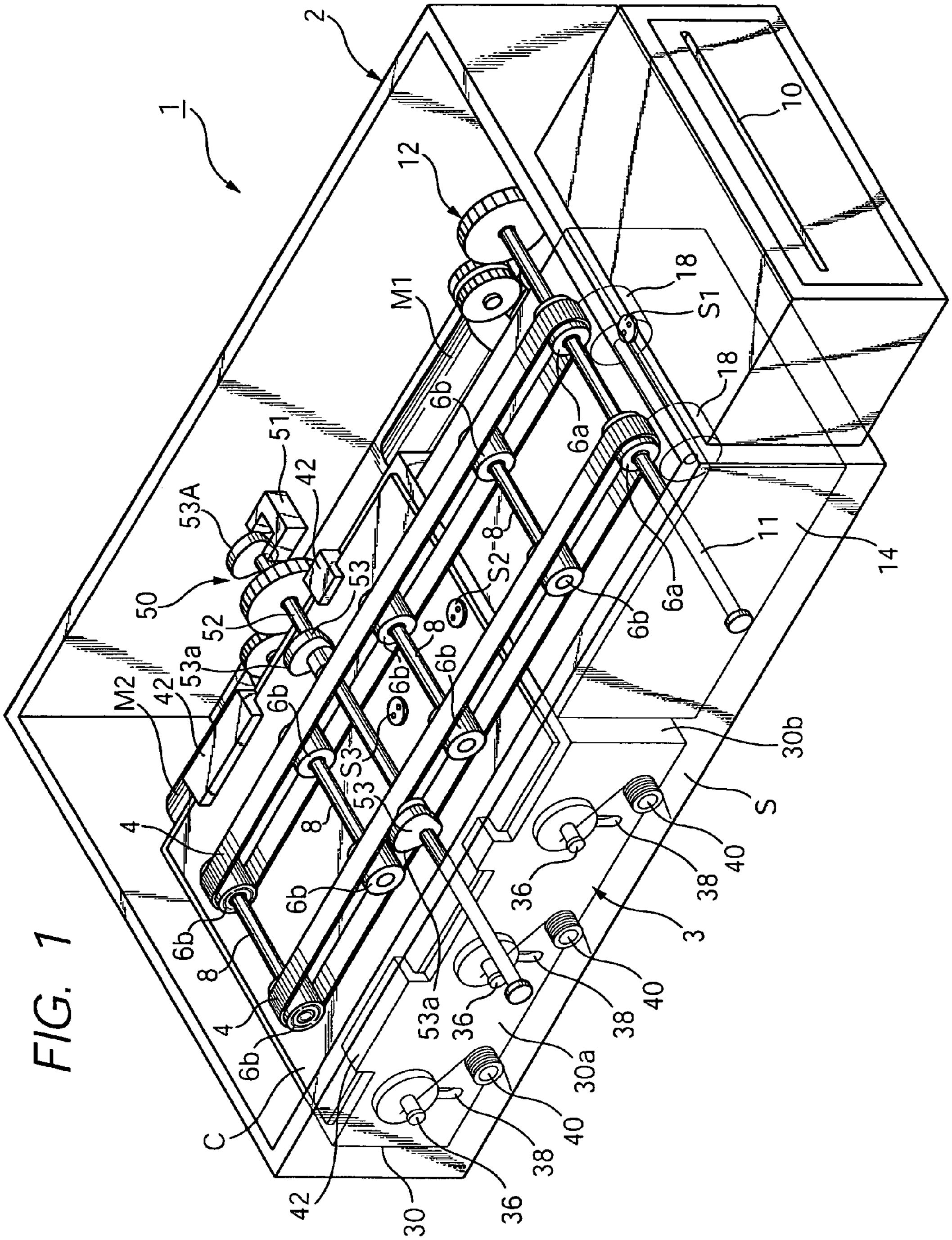
FIG. 1 is a perspective view showing a schematic configuration of a recording medium dispensing machine according to one embodiment of the present invention.

FIG. 1 shows a recording medium dispensing machine 1 according to one embodiment of the present invention. The recording medium dispensing machine 1 is provided with a main body case (a main boy) 2 having a carry in/out opening 10 through which a recording medium C such as an IC card is carried in and out, and a stacker 3 as a storage device which is installed inside the main body case 2 and is capable of storing a plurality of recording media C in a stacked state.

The main body case 2 has carrying means (carrying device) for carrying a recording medium C along its longitudinal direction. The carrying means is comprised of a pair of endless carry belts (belts with teeth) 4 and 4 which extend along the longitudinal direction of the main body case 2. The carry belts 4 and 4 cooperate to form a carry path of the recording medium C, while being spaced apart from each other in the width direction of the main body case 2 and extending in parallel with each other, and are spanned around (engaged with) a plurality of rollers (gears), *6a* and *6b*, disposed along the longitudinal direction of the main body case 2.

Specifically, each of the carry belts 4 is spanned around a driving roller *6a* and a plurality of following rollers (driven rollers) *6b* spaced apart from one another along the longitudinal direction of the main body case 2, and is driven to rotate by the rotation of the driving roller *6a*. In this case, following rollers *6b* and *6b* respectively of the carry belts 4 and 4 adjacent to each other in the width direction of the main body case 2 are supported rotatably by a common fixed shaft 8 extending in the width direction of the main body case 2. In other words, in this embodiment, a plurality of fixed shafts 8 are fixed to the main body case 2, while extending in the width direction of the main body case 2 and being spaced apart from one another along the longitudinal direction of the main body case 2. Each of the fixed shafts 8 rotatably supports a pair of following rollers 6*b* and 6*b* that are spaced apart from each other and that support respective carry belts 4.

Meanwhile, driving rollers 6*a* and 6*a* respectively of the carry belts 4 and 4 adjacent to each other in the width direction of the main body case 2 are fixed to a common rotation shaft 11 extending in the width direction of the main body case 2. The rotation shaft 11 is rotatably supported by the main body case 2. One end of the rotation shaft 11 is coupled to a rotation axis of a carry motor (a first driving portion) M1 via a gear line 12 comprised of a plurality of gears that engage with each other. Accordingly, when the carry motor M1 is driven, the rotation axis of the carry motor M1 rotates, and the rotation force is conveyed to the rotation shaft 11 via the gear line 12 to rotate the driving rollers 6*a*, and thereby causes the carry belts 4 spanned around (engaged with) the driving rollers 6*a* to rotate.

The main body case 2 is further provided in a row arrangement with a stacker storage space S that stores the stacker 3, and a recording medium read/write device (hereinafter, referred to as a reader/writer) 14 such as a non-contact IC antenna as a recording medium processing portion. In this case, the space S and the reader/writer 14 are disposed under the carrying means along the carry path formed of the carry belts 4. The reader/writer 14 located on the carry in/out opening 10 side is capable of reading the recorded information on the recording medium C, while recording (writing) predetermined information on the recording medium C. Further, the reader/writer 14 may transmit the read information to an external apparatus, or may receive information to record on the recording medium C from an external apparatus, when necessary.

In addition, the reader/writer 14 is provided with feed rollers 18 each in a position opposite to the driving rollers 6*a* of the carrying means. The feed rollers 18 cooperate with the carry belts 4 to carry the recording medium C into/out of the main body case 2, while holding the recording medium C, which is in friction contact with the carry belts 4 and carried by the belts 4, with the belts 4 to guide.

The main body case 2 is further provided with a first sensor S1 that detects that the recording medium C is carried into or out of the main body case 2, a second sensor S2 that detects a position of the recoding medium C for the reader/writer 14 to read or write, and a third sensor S3 that detects whether or not the recording medium C is present in the stacker 3. In this embodiment, these sensors S1, S2 and S3 are, for example, reflective type optical sensors, and installed on a substrate (not shown) supported by the main body case 2.

The stacker 3 stored in the stacker storage space S has a storage case 30 capable of storing a plurality of recording media C with the media stacked vertically. The storage case 30 is attached to the main body case 2 rotatably via a rotation axis 32, and capable of rotating between a storage position (first position shown by solid lines in FIG. 2B) where the storage case 30 is set in the stacker storage space S and a separation position (for example, a second position shown by chain double-dashed lines in FIG. 2B) where the case 30 is separated from the stacker storage space S.

Inside the storage case 30 are provided a plurality of support rollers 34 that support the recording medium C from the lower side. The support rollers 34 are attached rotatably to shafts 36 that are movable upwardly and downwardly and that always given the force upwardly. Specifically, to the storage case 30 are attached a plurality of movable shafts 36 which extend in the width direction of the storage case 30 and are spaced apart from one another along the longitudinal direction of the storage case 30, and each of the shafts 36 rotatably supports a pair of support rollers 34 and 34 spaced apart from each other. Each of the shafts 36 penetrates a respective slit (elogated hole extending in the depth direction of the storage case 30) 38 formed on the side surface 30*a* of the storage case 30 and protrudes outside the storage case 30. A torsion spring (force applying means: force applying member) 40 that always applies the force to the shaft 36 upwardly is inserted into between the end portion of the protruding shaft 36 and the side surface 30*a* of the storage case 30.

Figure 2A:
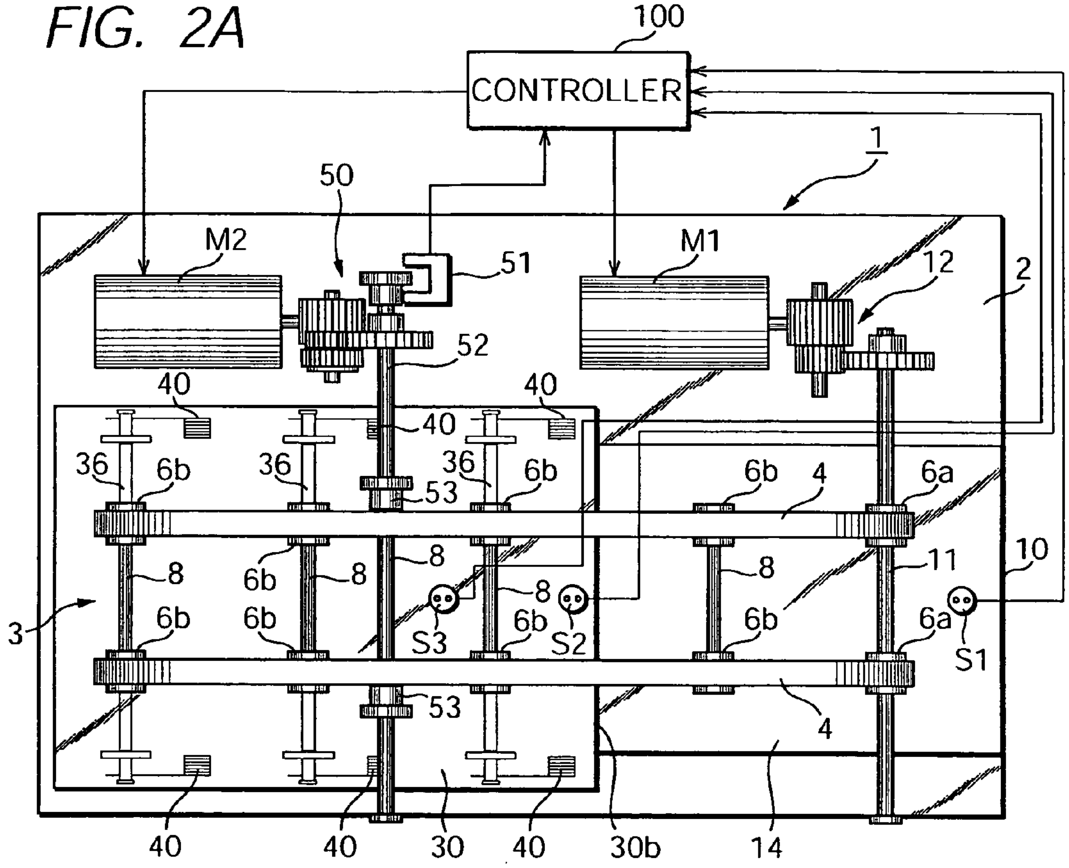
FIG. 2A is a plan view of the recording medium dispensing machine of FIG. 1.
Figure 2B:
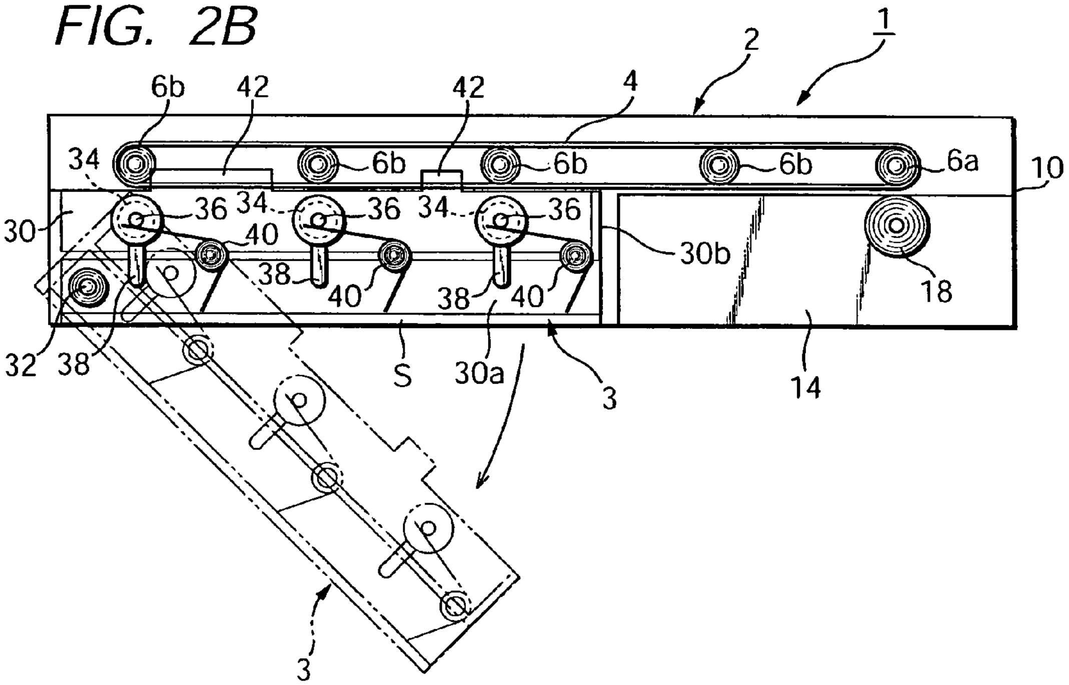
FIG. 2B is a side view of the recording medium dispensing machine of FIG. 1.

Accordingly, in such a structure, when the stacker 3 is separated from the stacker storage space S (the stacker 3 is positioned in the separation position shown by chain double-dashed lines in FIG. 2B), it is possible to store the recording medium C in the storage case 30, or fetch the recording medium C from the storage case 30. In this case, since the shaft 36 that supports the support rollers 34 is capable of moving downwardly along the slit 38 against the force applied by the torsion spring 40, when the recording medium C is placed on the support rollers 34 of the storage case 30 and pushed downward, the recording medium C is stacked and placed on the support rollers 34 sequentially.

In addition, in order to prevent the recording medium C on the support rollers 34 from dropping out of the storage case 30 where each roller 34 is pressed upward by the force applied by the torsion spring 40, a support member 42 is formed at an upper edge portion of the side surface of the storage case 30, and presses from the upper side the recording medium C stored in the storage case 30 to support. Accordingly, the recording medium C in the storage case 30 is pressed against the support member 42 by the force applied by the torsion spring 40, and thus is sandwiched between the support rollers 34 and the support member 42.

Further, in the structure as described above, when the stacker 3 is set in the storage position inside the stacker storage space S, as shown by solid lines in FIG. 2B, the support member 42 is positioned higher than the carry surface of the carry belt 4 so as not to inhibit the carry of the recording medium C, while each support roller 34 is opposite to, for example, the following roller 6*b* of the carrying means. At this point, when the recording medium C is not placed on the support roller 34, the shaft 36 comes into contact with the upper end of the slit 38 by the force applied by the torsion spring 40, and thereby is limited in further upward moving, and a space corresponding to a thickness equal to or less than that of a sheet of the recording medium is formed between the support member 42 and the support rollers 34 (accordingly, when the recording medium C is stored in the storage case 30 in the separation position, the recording medium can be supported reliably between the support rollers 34 and the support member 42). Further, the space is positioned on the carry path of the carry belts 4, and thus accepts the recording medium C carried by the carry belts 4. Meanwhile, when the recording medium C is placed on the support rollers 34, the recording medium C is pressed against the carry belts 4 of the carrying means by the force applied by the torsion springs 40 via the support rollers 34. At this point, among recording media C placed on the support rollers 34, only the recording medium C positioned on the top is positioned on the carry path (see FIG. 3A), and capable of being carried out of the storage case 30 by the carry belts 4. Further, the second and subsequent recording media C placed on the support rollers 34 are brought into contact with the front surface (restricting portion) 30*b* of the storage case 30 faced opposite the carry in/out opening 10, inhibiting the recording media C from exiting the storage case 30.

The main body case 2 is further provided with a pair of cams (pressing means: pressing member) 53 that press down recording media C stored in the stacker 3 against the force applied by the torsion spring 40 and separate the top recording medium C stored in the stacker 3 from the carry belts 4 (to release a contact state of the top recording medium C with the carry belt 4). The cams 53 (action point of the cams 53 on the recording medium) are disposed to the carry in/out opening 10 side of the center of the stacker 3 in the longitudinal direction, and fixed to a rotation shaft 52 extending in the width direction of the main body case 2. The rotation shaft 52 is supported rotatably by the main body case 2. One end of the rotation shaft 52 is coupled to the rotation axis of a cam driving motor (a second driving portion) M2 via the gear line 50 comprised of a plurality of gears engaged with each other.

Accordingly, in such a structure, driving the cam driving motor M2 rotates the rotation axis of the cam driving motor M2, and the rotation force is conveyed to the rotation shaft 52 via the gear line 50 and rotates the cams 53.

In addition, each of the cams 53 has a cam surface 53*a* capable of pressing the recording medium C down in the predetermined rotation position. A cam angle sensor 51 (fourth sensor) detects a rotation position of the cam surface 53*a*, whereby the operation is controlled for the cam 53 to press the recording medium C down through the cam driving motor M2. In particular, in this embodiment, for example, the cam angle sensor 51 optically captures a cam shape of a dummy cam 53A for detection which has the same shape as that of the cam 53 and fixed to the rotation shaft 52, and thereby detects a rotation position of the cam surface 53*a*, while driving of the cam driving motor M2 is controlled corresponding to a result of detection from the cam angle sensor 51, and the cam 53 is thus driven to rotate, for example, at 180-degree intervals between the recording medium pressing down position (position shown in FIG. 3B) where the cam surface 53*a* is in contact with the recording medium C and the recording medium releasing position (position shown in FIGS. 3A and 3C) where the cam surface 53*a* is separated from the recording medium C.

In addition, as described later, in the recording medium pressing down position (cam operation position), the recording medium C (the top recording medium C) stored in the storage case 30 of the stacker 3 is not in contact with the carry belts 4, and therefore, cannot be discharged by the carry belts 4, but a space capable of further accepting another sheet of recording medium C is formed between the carry belts 4 and the top recording medium C. Meanwhile, in the recording medium releasing position (cam non-operation position), the top recording medium C stored in the storage case 30 is in contact with the carry belts 4, and therefore, can be carried by the carry belts 4. Further, in this embodiment, based on detected results of various sensors, S1, S2, S3 and 51, the driving of the motors M1 and M2 is controlled with a control signal from a controller 100 (in FIG. 2A, to explain clearly, the controller 100 is divided from the main body case 2 and shown) or an external control apparatus.

The operation of the recording medium dispensing machine 1 with the above-mentioned configuration will be described below with reference to FIGS. 3A to 3C.

A case will be described first of receiving the recording medium C in the recording medium dispensing machine 1. In this case, the recording medium C inserted through the carry in/out opening 10 is detected by the first sensor S1. In this embodiment, when the recording medium C is inserted through the carry in/out opening 10, for example, the first sensor S1 is switched on. When the first switch S1 is switched on, the carry motor M1 is driven, and the recording medium C inserted through the carry in/out opening 10 is carried into the main body case 2 by the carry belts 4.

Figures 3A, 3B, 3C:
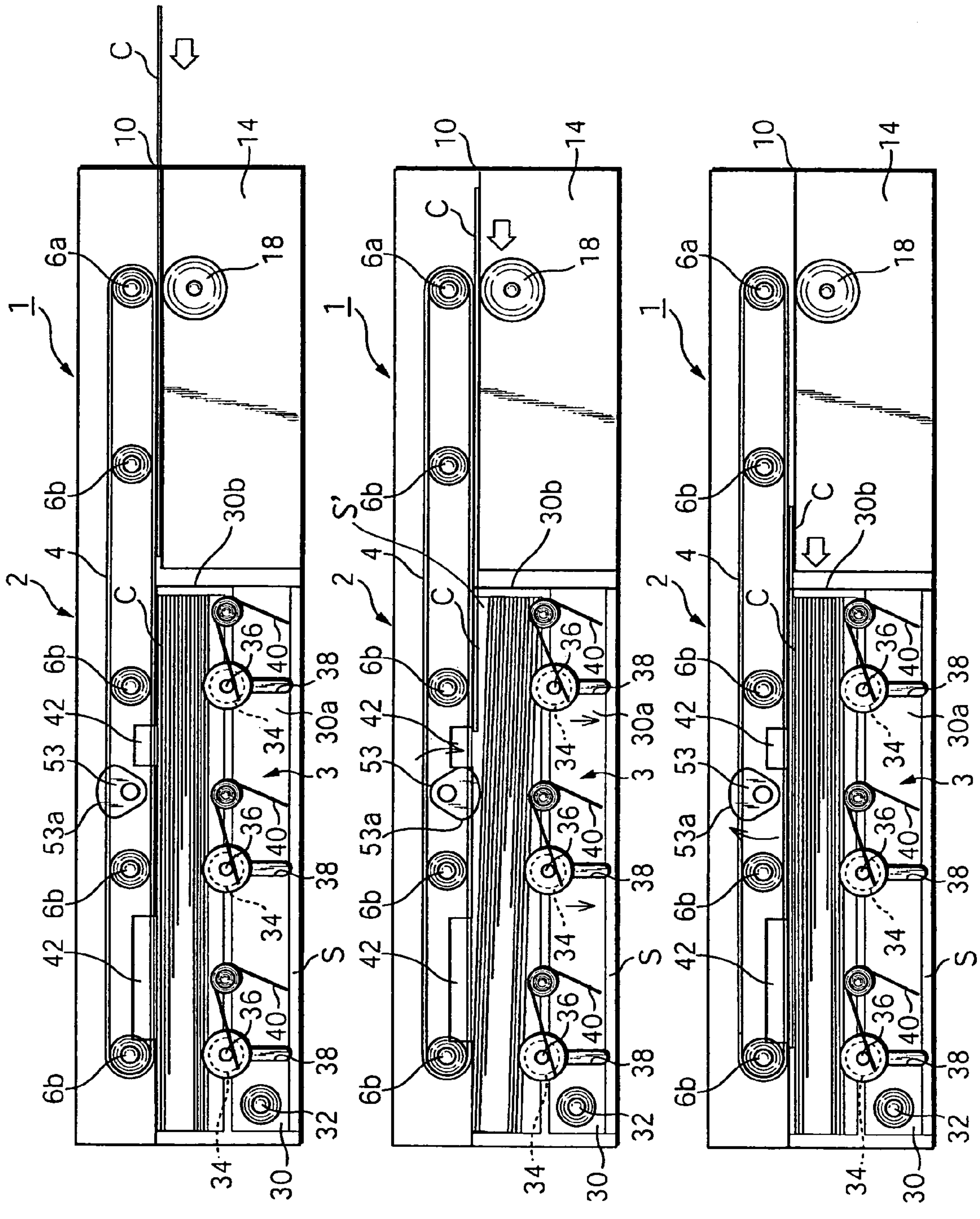
FIGS. 3A to 3C are schematic views showing stepwise the operation of the recording medium dispensing machine of FIG. 1.

Further, when the first sensor S1 is switched on, the cam driving motor M2 is driven, and, for example, the cam 53 is rotated by 180 degrees from the recording medium releasing position as shown in FIG. 3A to the recording medium pressing down position (position as shown in FIG. 3B) where the cam surface 53*a* comes into contact with the recording medium C. When the cam 53 is rotated to the recording medium pressing down position, the cam driving motor M2 is halted, and the cam 53 protrudes into the carry path due to the carry belts 4. At this point, when recording media C are already stored in the storage case 30, the recording media C stored in the storage case 30 are pressed down by the cam 53, and the top recording medium C is separated from the carry belt 4, whereby a space S capable of receiving a sheet of recording medium C inserted through the carry in/out opening 10 is formed between the carry belts 4 and the top recording medium C. In this case, since the action point of the cam 53 on the recording medium C is positioned to the carry in/out opening 10 side of the center in the longitudinal direction of the stacker 3, the recording media C stacked in the storage case 30 are inclined downwardly toward the carry in/out opening 10. Meanwhile, when the storage medium C is not stored in the storage case 30, the cam 53 does not provide the function of pressing down the medium by the cam surface 53*a* even when rotated to the recording medium pressing down position, but a space capable of receiving a sheet of recording medium C is formed between the carry belts 4 and the support rollers 34 due to the contact of the shaft 36 and the slit 38 as described earlier.

When the carry belts 4 are further driven continuously in the state as described above, a front end portion in the carry direction of the recording medium C inserted through the carry in/out opening 10 enters the space S and the recording medium C partly overlaps the recording media C in the storage case 30 (the state shown in FIG. 3B). When the recording medium C reaches the state, the first sensor S1 is switched off, the second sensor S2 is switched on, and the carry motor M1 is halted. Then, in this position, the reader/writer 14 performs read/write of the recording medium C.

After the reader/writer 14 completes the read/write of the recording medium C, when the recording medium C is discharged outside the main body case 2, the carry motor M1 is rotated in the reverse direction, and the recording medium C is carried out through the carry in/out opening 10. Meanwhile, in the case of storing the recording medium C in the storage case 30, the cam driving motor M2 is driven again, and the cam 53 is rotated by 180 degrees from the recording medium pressing down position shown in FIG. 3B to the recording medium releasing position shown in FIG. 3C to escape from the carry path. In this state, the carry motor M1 is rotated in the forward direction to draw the recording medium C completely into the storage case 30. At this point, the support rollers 34 or the recording medium C already stored in the storage case 30 guides the recording medium C carried by the carry belts 4 in friction contact with the belts 4. When the recording medium C is completely stored in the storage case 30 and the second sensor S2 is switched off, the carry motor M1 is halted after a lapse of predetermined time (for example, 0.5 second).

A case will be described next where the recording medium C stored in the stacker 3 is discharged from the recording medium dispensing machine 1. In this ghcase, first, it is checked by the third sensor S3 whether or not the recording medium C is present in the storage case 30. When it is confirmed that the recording medium C is present in the storage case 30, in the state where the cam 53 is positioned in the recording medium releasing position (the state as shown in FIGS. 3A and 3C), i.e. in the state where the top recording medium C in the storage case 30 is in contact with the carry belts 4, the carry motor M1 is rotated in the reverse direction. By this means, the top recording medium C in the storage case 30 is carried toward the carry in/out opening 10 by the carry belts 4. Then, when the carried recording medium C reaches the read/write position of the reader/writer 14, for example, the first sensor S1 is switched on, and the carry motor M1 is halted. Further, at this point, by driving the cam driving motor M2, the cam 53 is rotated to the recording medium pressing down position (position shown in FIG. 3B), whereby the front surface 30*b* of the storage case 30 holds second and subsequent recording media C stored in the storage case 30. This is because of preventing the second and subsequent recording media C from being carried out of the storage case 30 together with the top recording medium C in the storage case 30 being carried by the carry belts 4. In this embodiment, since the action point of the cam 53 on the recording media C is positioned to the carry in/out opening 10 side of the center in the longitudinal direction of the stacker 3, the stacked recording media C are pressed down and tilted on the carry in/out 10 side at the time of the pressing down operation of the cam 53, and the second and subsequent recording media C are reliably held by the front surface 30*b*.

When the reader/writer 14 completes the write/read of the recording medium C in the aforementioned state, the carry motor M1 is further rotated in the reverse direction, and the recording medium C is carried out through the carry in/out opening 10. When the first sensor S1 is switched off, it is regarded that the discharge is completed, and the carry motor M1 is halted. In addition, when the first sensor S1 is not switched off five seconds later after the recording medium C is discharged, the carry motor M1 is forcibly halted.

As described above, the recording medium dispensing machine 1 of this embodiment is provided with the carry in/out opening 10 through which the recording medium C to record predetermined information thereon is carried in/out, the stacker 3 as a storage device capable of storing a plurality of recording media in a stacked state, the carry belts 4 that carry the recording medium C back and forth between the stacker 3 and the carry in/out opening 10, and the cams 53 and the torsion springs 40 as storage/feeding means (storage/feeding device) for causing the recording medium C stored in the stacker 3 to separate or protrude from/into the carry path due to the carry belts 4 inside the stacker 3, and thereby storing each sheet of the recording medium C carried by the carry belts 4 in the stacker 3 to be stacked, while causing the recording media C stored in the stacker 3 to be fed on a signal sheet basis from the stacker 3 by the carry belts 4.

Thus, only by causing the recording medium C accommodated in the stacker 3 to separate or protrude from/into the carry path due to the carry belts 4 inside the stacker 3, it is possible to store a plurality of recording media C in the stacker, while feeding the recording media C from the stacker 3 on a single sheet basis, thereby enabling a simple and compact structure to serve as both the functions of storing and discharging the recording medium C, and it is possible to reuse the recording media C with simplicity.

In particular, in this embodiment, the recording medium C stored in the stacker 3 is always given the force by the torsion springs 40 and thereby pressed against the carry belts 4, while the cams 53 press the recording medium C stored in the stacker 3 into the stacker 3 against the force (pressing force) applied by the torsion springs 40 so that the recording medium C stored in the stacker 3 is separated from the carry belts 4, whereby only the operation in a single direction for pressing the recording medium C into the stacker 3 enables the recording medium C to be stored and discharged in/from the stacker 3. Accordingly, it is possible to further make the structure compact and perform storage and discharge of recording media efficiently.

Further, in this embodiment, the stacker 3 has the front surface 30*b* as a restricting portion that restricts feeding of the recording media C except the recording medium C fed from the stacker 3 by the carry belts 4, at an end portion positioned on the side where the recording medium C is fed. Accordingly, only a single sheet of the recording medium C to discharge from the stacker 3 is carried by the carry belts 4, and the front surface 30*b* prevents the other recording media C from being carried, whereby second and subsequent recording media are prevented from being erroneously fed from the stacker 3 together with the first recording medium C. In other words, it is possible to feed the recording medium C from the stacker 3 reliably on a single sheet basis.

Furthermore, in this embodiment, each of the cams 53 applies the pressing force to the recording medium C at the operation point positioned to the carry in/out opening 10 side of the center of the stacker 3 in the carry direction by carry belts 4. Accordingly, since a portion at the carry in/out opening side of the recording medium C in the stacker 3 is pressed larger than the other portion of the medium when the cams 53 press the medium, it is possible to make it reliable that the front surface 30*b* restricts feeding of the recording medium C.

The recording medium dispensing machine 1 of this embodiment is further provided with the reader/writer 14 that reads and writes information from/in the recording medium C in a position on the carry path due to the carry belts 4. Accordingly, it is possible to perform not only storage and discharge of the recording medium C but also reading and writing of the information from/in the recording medium C. Further, since the reader/writer 14 is provided at a position on the carry path due to the carry belts 4, it is possible to integrate the recording medium read/write portion and the recording medium storage portion in a compact configuration.

Moreover, in the recording medium dispensing machine 1 of this embodiment, since the carry path due to the carry belts 4 extends in the shape of a straight line, distortion does not occur on the carried recording medium C. Therefore, it is possible to prevent damage to electronic elements such as IC chips integrated inside the recording medium C.

Figure 4B:
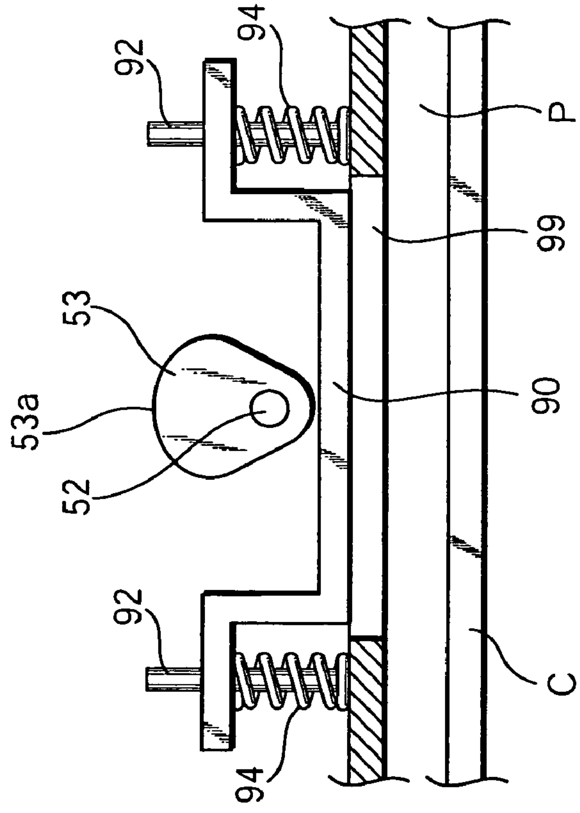
FIG. 4B is a view showing a state where the pressuring force by the cam is released and the buffer member thereby escapes from the carry path.
Figure 4A:
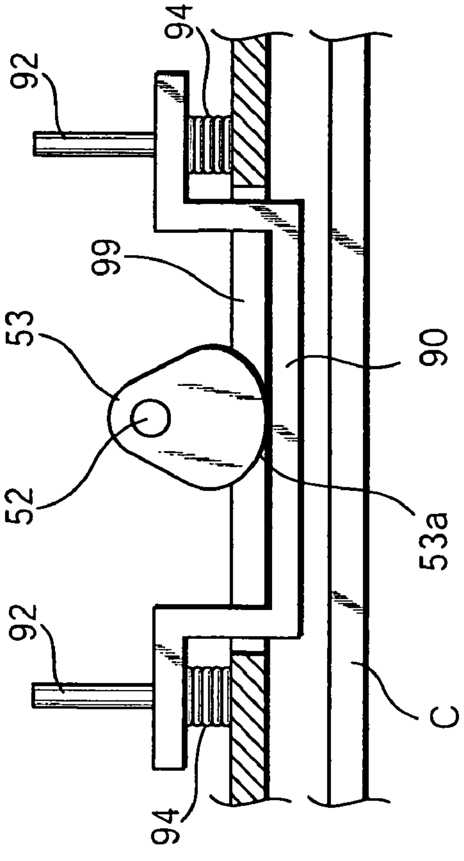
FIG. 4A is a view showing a state where a buffer member protrudes into a carry path by the operation of a cam.

In addition, it is described in this embodiment that the cams 53 are directly in contact with the recording medium C, but it is possible to provide a buffer member between each of the cams 53 and the recording medium C so that the cams 53 do not slide on the recording medium C nor give damage to the recording medium C. An aspect of this case is shown in FIGS. 4*a* and 4B. In this aspect, a buffer member 90 with a concave-shaped cross section is present between the cam 53 and the recording medium C. The buffer member 90 has a smooth contact surface coming into contact with the recording medium C, is attached movably to the shaft 92 provided to protrude from the main body case 2, and capable of moving along the shaft 92 to protrude or escape into/from the carry path P of the carry belts 4 through an opening 99 formed in the main body case 2. In this case, the shaft 92 is wounded by a spring 94 inserted between the main body case 2 and the buffer member 90. The buffer member 90 is pressed by the cam surface 53*a* of the cam 53 against the force applied by the spring 94, and thereby capable of protruding into the carry path P. In addition, FIG. 4A shows a state where the buffer member 90 protrudes into the carry path P due to the operation of the cam 53, and FIG. 4B shows a state where the buffer member 90 is released from the pressing force applied by the cam 53 and escapes from the carry path P.

Figure 5:
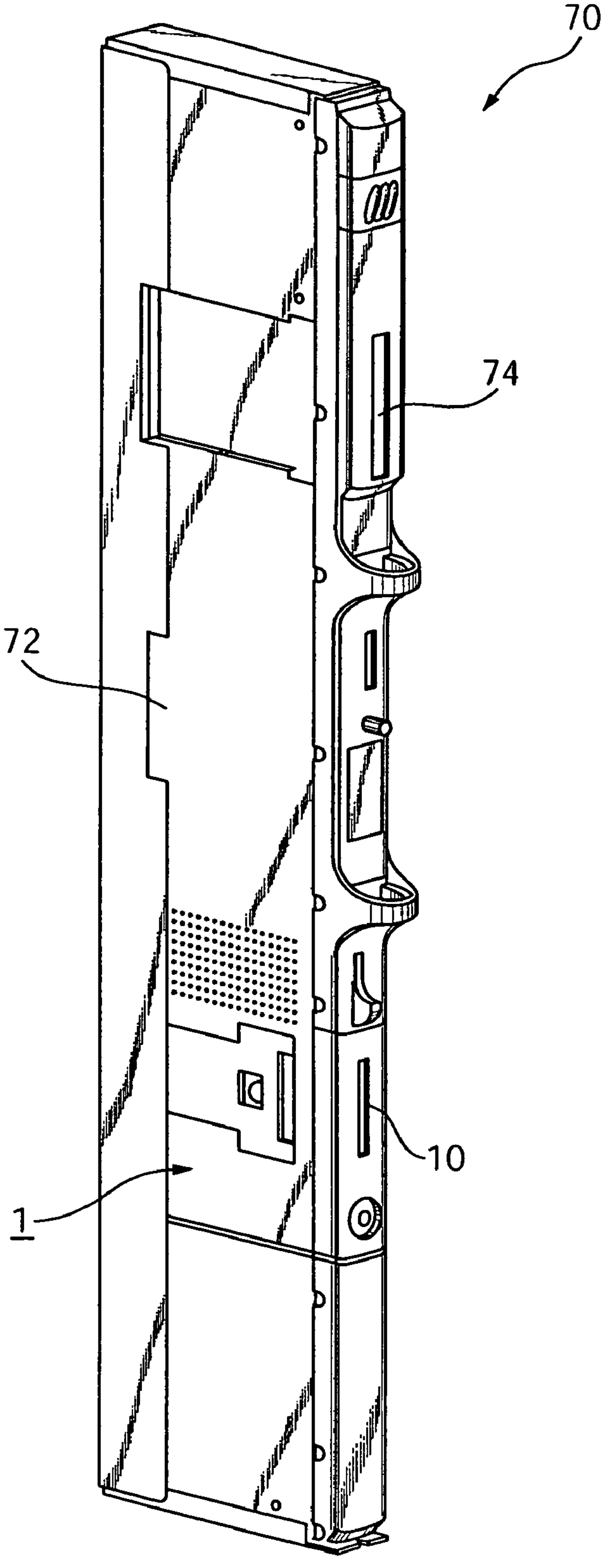
FIG. 5 is a perspective view where the recording medium dispensing machine of FIG. 1 is applied to a ball lending apparatus of a pachinko machine.

FIG. 5 shows a ball lending machine 70 with the recording medium dispensing machine 1 of this embodiment integrated therein. The ball lending machine 70 is a game medium supplying apparatus that supplies pachinko balls as game media used in a pachinko machine as a game machine, and is installed in pachinko machines in a game place or the like. The ball lending machine 70 is provided with a bank bill inserting opening 74 at the front upper portion of a housing 72, and the housing 72 is provided at the front lower portion with the carry in/out opening 10 of the recording medium dispensing machine 1. By inserting the recording medium with predetermined information for instructing supply of the game medium recorded thereon into the recording medium dispensing machine 1, the ball lending machine 70 transmits a signal for instructing to supply pachinko balls to the pachinko machine. The recording medium dispensing machine 1 of this embodiment is very compact, and therefore capable of being integrated readily into the ball lending machine 70 installed between pachinko machines while providing the effects and advantages as described above.

In addition, as a matter of course, the present invention is not limited to the above-mentioned embodiment, and is capable of being carried into practice with various modifications thereof without departing from the subject matter. For example, in the above-mentioned embodiment, the cams 53 are used as the pressing means, and the motor is used as means for driving the cams 53, but it may be possible to use a link instead of the cams 53 and a solenoid instead of the motor. Further, in the above-mentioned embodiment, the cams 53 directly press the recording medium C down. However, when the recording medium dispensing machine 1 is used with the carry path due to the carry belts 4 positioned horizontally, the cams 53 may press the support rollers 34 downwardly, the recording medium C thereby separates from the carry belts 4 due to its weight, and it is not necessary for the cams 53 to directly press the recording medium C down.

Additional advantages and modifications will readily occur to those skilled in the art. Therefore the invention in its broader aspects is not limited to the specific details and representative embodiments shown and described herein. Accordingly, various modifications may be made without departing from the sprit or scope of the general inventive concept as defined by the appended claims and their equivalents.

What is claimed is:

1. A recording medium dispensing machine comprising:

a main body having a carry in/out opening through which a recording medium to record predetermined information thereon is carried in/out;

a storage device that is provided inside the main body to store a plurality of the recording media in a stacked manner;

a carrying device that carries the recording medium back and forth between the storage device and the carry in/out opening; and a storage/feeding device which pushes upward or downward the recording medium stored in the storage device into/from a carry path formed by the carrying device, and whereby causes the recording medium carried by the carrying device to be stored in the storage device, while causing the recording medium stored in the storage device to be fed from the storage device by the carrying device.

2. The recording medium dispensing machine according to claim 1, wherein the storage/feeding device pushes upward or downward the recording medium stored in the storage device into/from the carry path inside the storage device.

3. The recording medium dispensing machine according to claim 1, wherein the storage/feeding device comprises:

a force applying member which always applies a force to the recording medium stored in the storage device toward the carrying device, and protrudes at least a part of the recording medium stored in the storage device into the carry path; and a pressing member that presses the recording medium protruding into the carry path into the storage device against the force applied by the force applying member, and thereby separates the recording medium from the carry path.

4. The recording medium dispensing machine according to claim 3, wherein the storage device comprises a plurality of support rollers that support the recording medium stored in the storage device and a movable shaft which supports the support rollers rotatably and is capable of traveling in the stacked direction of the recording medium, and wherein the force applying member applies a force to the movable shaft.

5. The recording medium dispensing machine according to claim 4, wherein the storage device has a slit that regulates a traveling amount of the movable shaft, and an end portion of the movable shaft is inserted into the slit.

6. The recording medium dispensing machine according to claim 4, wherein the storage device has a slit through which an end portion of the movable shaft is inserted and which regulates a traveling amount of the movable shaft, and a support member that prevents the recording medium from dropping out of the storage device due to the force applied by the force applying member, and the slit regulates the traveling of the movable shaft due to the force applied by the force applying member so that a space for receiving and holding the recording medium is formed between the support member and the support rollers while no recording medium stored in the storage device.

7. The recording medium dispensing machine according to claim 3, wherein the force applying member is comprised of a spring.

8. The recording medium dispensing machine according to claim 3, wherein the storage device has a support member that prevents the recording medium from dropping out of the storage device due to the force applied by the force applying member.

9. The recording medium dispensing machine according to claim 3, wherein the storage device has a restricting portion that restricts feeding of the recording medium stored in the storage device, except for the recording medium that is fed from the storage device by the carrying device, at an end portion positioned on the side where the recording medium is fed out.

10. The recording medium dispensing machine according to claim 9, wherein the pressing member applies a pressing force to the recording medium, at an action point positioned to the carry in/out opening side of the center of the storage device in the carry direction by the carrying device.

11. The recording medium dispensing machine according to claim 3, wherein the pressing member has a cam with a cam surface that presses the recording medium.

12. The recording medium dispensing machine according to claim 11, wherein the cam is fixed to a rotation shaft supported rotatably by the main body, and rotation of the rotation shaft causes the cam surface to act on the recording medium in a predetermined rotation position of the rotation shaft.

13. The recording medium dispensing machine according to claim 11, further comprising:

a buffer member that is inserted between the cam and the recording medium and that absorbs impact of contact between the cam surface and the recording medium.

14. The recording medium dispensing machine according to claim 13, wherein the buffer member is regularly forced toward the cam side.

15. The recording medium dispensing machine according to claim 1, wherein the carrying device has a pair of carry belts which extend along the longitudinal direction of the main body in parallel and are spaced apart with/from each other, and form the carry path for the recording medium.

16. The recording medium dispensing machine according to claim 1, wherein the storage device has a storage case that forms an accommodation space to accommodate a plurality of the recording media in a stacked manner, and the storage case is attached to the main body to rotate between a first position where the storage case is stored in the main body and a second position where the storage case is exposed outside the main body.

17. The recording medium dispensing machine according to claim 1, further comprising:

a recording medium read/write device that reads and writes information on the recording medium in a position on the carry path.

18. The recording medium dispensing machine according to claim 1, further comprising:

a first driving portion that drives the carrying device;

a second driving portion that drives the storage/feeding device;

a recording media read/write device that reads and writes information on the recording medium in a position on the carry path;

a first sensor that detects that the recording medium is carried in or out through the carry in/out opening;

a second sensor that detects a position for read or write of the recording medium by the recording medium read/write device;

a third sensor that detects whether or not the recording medium is present in the storage device;

a fourth sensor that detects a state of operation of the storage/feeding device; and a controller that controls the first driving portion and the second driving portion based on a detection signal from each sensor, and whereby controls storage and feeding of the recording media in the storage device and read and write of the information.

19. A recording medium dispensing machine comprising:

a main body having a carry in/out opening through which a recording medium to record predetermined information thereon is carried in/out;

storage means that is provided inside the main body for storing a plurality of recording media in a stacked manner;

carrying means for carrying the recording medium back and forth between the storage means and the carry in/out opening; and storage/feeding means for causing a recording medium stored in the storage means to separate or protrude from/into a carry path formed by the carrying means, and whereby causing the recording medium carried by the carrying means to be stored in the storage means, while causing the recording medium stored in the storage means to be fed from the storage means by the carrying means.

20. The recording medium dispensing machine according to claim 19, wherein the storage/feeding means comprises:

force applying means for regularly applying a force to the recording medium stored in the storage means toward the carrying means, and protrudes at least a part of the recording medium stored in the storage means into the carry path; and pressing means for pressing the recording medium protruding into the carry path into the storage means against the force applied by the force applying means, and whereby separates the recording medium from the carry path.

21. A game medium supplying machine that supplies a predetermined game medium used in a game machine, comprising:

a recording medium dispensing machine that dispenses a recording medium which records predetermined information thereon to instruct supply of the game medium, wherein the recording medium dispensing machine comprises:

a main body having a carry in/out opening through which a recording medium to record predetermined information thereon is carried in/out;

a storage device that is provided inside the main body to store a plurality of recording media in a stacked manner;

a carrying device that carries the recording medium back and forth between the storage device and the carry in/out opening; and a storage/feeding device which causes a recording medium stored in the storage device to separate or protrude from/into a carry path formed by the carrying device, and whereby causes the recording medium carried by the carrying device to be stored in the storage device, while causing the recording medium stored in the storage device to be fed from the storage device by the carrying device.

22. A recording medium dispensing method, comprising:

guiding a recording medium to inside a recording medium dispensing machine, while carrying the recording medium along a predetermined carry path in the recording medium dispensing machine;

pressing other recording medium already stored in a storage device in the recording medium dispensing machine into the storage device to separate from the carry path with the recording medium guided to inside the recording medium dispensing machine, and whereby forming a space for receiving the recording medium in the storage device; and carrying the recording medium to the space along the carry path, and whereby storing the recording medium in the storage device.

23. A recording medium dispensing method, comprising: guiding a recording medium to inside a recording medium dispensing machine through a carry in/out opening, while carrying the recording medium along a predetermined carry path in the recording medium dispensing machine, by friction contact with a carry belt driven in a first direction;

pressing other recording medium already stored in a storage device in the recording medium dispensing machine into the storage device to separate from the carry belt with the recording medium guided to inside the recording medium dispensing machine, and whereby forming a space for receiving the recording medium between the other recording medium stored in the storage device and the carry belt;

halting driving of the carry belt at the time part of the recording medium carried by the carry belt enters the space, and in this state, releasing operation of pressing the recording medium into the storage device, whereby supporting the recording medium carried by the carry belt between the carry belt and the other recording medium stored in the storage device; and driving the carry belt again in the first direction, and whereby carrying the recording medium supported between the carry belt and the other recording medium in the storage device into the storage device by the carry belt.

24. The recording medium dispensing method according to claim 23, wherein read and/or write of information on the recording medium is performed at the time the driving of the carry belt is halted.

25. The recording medium dispensing method according to claim 24, wherein when the recording medium is discharged from the recording medium dispensing machine after completing the read and/or write of information on the recording medium, the carry belt is driven in a second direction opposite to the first direction, and the recording medium is whereby discharged outside through the carry in/out opening.

26. A recording medium dispensing method, comprising:

carrying a recording medium in friction contact with a carry belt in a storage device by the carry belt along a predetermined carry path in a recording medium dispensing machine with recording media stored in the storage device in the recording medium dispensing machine;

halting driving of the carry belt when part of the recording medium carried by the carry belt is drawn from the storage device, pressing the recording media in the storage device into the storage device except the carried recording medium to hold in the storage device, and thus restricting carrying of the recording media by the carry belt; and driving the carry belt again with the carry restricted, and whereby discharging the recording medium, part of which is drawn from the storage device, outside the recording medium dispensing machine.

27. The recording medium dispensing method according to claim 26, wherein read and/or write of information on the recording medium is performed at the time the driving of the carry belt is halted.

* * * * *